United States Patent
Garino et al.

(10) Patent No.: US 9,422,198 B1
(45) Date of Patent: Aug. 23, 2016

(54) OXIDIZED-ZIRCONIUM-ALLOY ARTICLE AND METHOD THEREFOR

(71) Applicant: RGP Innovations, LLC, Malvern, PA (US)

(72) Inventors: Jonathan P. Garino, Villanova, PA (US); Robert A. Ruggiero, Sr., West Chester, PA (US)

(73) Assignee: RGPInnovations, LLC, Malvern, PA (US)

( * ) Notice: Subject to any disclaimer, the term of this patent is extended or adjusted under 35 U.S.C. 154(b) by 0 days.

(21) Appl. No.: 14/679,335

(22) Filed: Apr. 6, 2015

(51) Int. Cl.
*C22C 16/00* (2006.01)
*C04B 35/48* (2006.01)

(52) U.S. Cl.
CPC .................................. *C04B 35/48* (2013.01)

(58) Field of Classification Search
CPC ............................ C22C 16/00; C22C 1/0458
See application file for complete search history.

(56) References Cited

U.S. PATENT DOCUMENTS

| | | | | |
|---|---|---|---|---|
| 4,000,013 A * | 12/1976 | MacEwen | ............... | C22F 1/186 148/672 |
| 4,226,647 A * | 10/1980 | Schulson | ................ | C22C 16/00 148/421 |
| 4,895,077 A * | 1/1990 | Miethlich | ............... | F42B 12/06 102/501 |
| 5,169,597 A | 12/1992 | Davidson et al. | | |
| 5,620,536 A * | 4/1997 | Dahlback | ............... | C22F 1/186 148/519 |
| 6,440,010 B1 * | 8/2002 | Deshmukh | ............. | A63B 53/04 473/335 |
| 6,849,085 B2 * | 2/2005 | Marton | ...................... | A61F 2/91 623/1.13 |
| 7,550,209 B2 * | 6/2009 | Pawar | ................. | A61F 2/30767 428/472 |
| 2007/0137734 A1 * | 6/2007 | Pawar | ................. | A61F 2/30767 148/206 |

* cited by examiner

*Primary Examiner* — Noah Wiese
(74) *Attorney, Agent, or Firm* — Robert R. Axenfeld

(57) ABSTRACT

Described are articles having, at least, an outer surface comprising unalloyed oxidized Zirconium with Niobium having a thickness and configurations suitable for sports equipment, golf clubs, aircraft, boat hulls, motor vehicle, propellers, helicopter rotors, and various other non-medical applications.

4 Claims, 2 Drawing Sheets

OXIDIZED-ZIRCONIUM-ALLOY ARTICLE AND METHOD THEREFOR

BACKGROUND

Oxidized-zirconium alloys may form a ceramic-oxide coating for orthopedic implants such as hip and knee replacements. These implants are generally biocompatible, strong, and scratch resistant.

SUMMARY

Described in this paper are ceramic-metallic-alloy articles comprised of ceramic Zirconium alloy materials for use in applications outside of the medical arts.

In one aspect, an article consists of Zirconium of about 70% unalloyed Zirconium and about 30% Niobium.

In another aspect, an article consists of between about (95-98%) unalloyed Zirconium and about (2-5%) Niobium (Zr705).

The article may be heated in oxygen environment at temperatures ranging between about 200° Celsius to about 880° Celsius, for a duration of between about 10 minutes to 110 minutes.

Exposing the article to thermal treatment in an oxygen-rich environment provides an oxidized-zirconium-alloy apparatus. One, two, or three heating cycles may be used, with a quenching cycle, such as a water or air, interposed between each heating step. The temperature and duration of heating are selected to provide a strongly adherent oxide-rich layer with increased scratch, wear and hardness resistance, and decreased friction resistance.

The surface of the alloy may be polished to increase wear and impact resistance while decreasing friction resistance. Other machining, casting, or forging of the alloy into a desire shape may be achieved by any suitable methods used with titanium or zirconium alloys.

In another example, the article is directed to sports equipment including a metallic alloy having a ceramic surface. In one example, a golf-club head (such as a driver, fairway wood, putter, irons, and the like) contains metallic alloy having a ceramic surface in different forms, such as a coating, as one or more layers of a portion of the head, encapsulated, integral, or selectively distributed at various locations of a golf-club head.

In another example, the shaft of a golf club or a tennis racket frame may also contain metallic alloy having a ceramic surface, and may be reinforced with other materials or intermixed as part of matrix. The shaft may also contain selectively concentrated portions or areas containing metallic alloy having a ceramic surface and other forms of zirconium oxide. The material of the shaft may also be encapsulated or layered with other materials.

The article may provide outer surfaces having ceramic properties for use in other applications other than sporting-goods equipment, including but not limited to: dishware, appliances, helmets, guns, tips for bullets or armor-piercing shells, penetrator materials for an armor piercing sabot, bullet-proof vests, armor vehicles including tanks and other armor-protecting vehicles, boat hulls, ship hulls, automobile bodies, truck bodies, airplane fuselages, the surface of airplane wings, helicopter rotors, and rockets.

The inventors also believe that airplanes, vehicles, boats hulls and other applications in which the surfaces must be hardened, and exhibit reduced friction and durability will benefit from the use of unalloyed oxidized Zirconium with Niobium.

The article may also be used as a casing in lieu of or in conjunction with plastics for computers, laptops, tablets, smart phones, cell phones, and the like.

This summary is provided to introduce a selection of concepts in a simplified form that are further described below. This summary is not necessarily intended to identify key features or essential features of the claimed subject matter, nor is it necessarily intended to be used as an aid in determining the scope of the claimed subject matter.

The foregoing outlines examples of this disclosure so that those skilled in the relevant art may better understand the detailed description that follows. Additional embodiments and details will be described hereinafter. Those skilled in the relevant art should appreciate that they can readily use any of these disclosed embodiments as a basis for designing or modifying other structures or functions for carrying out the invention, without departing from the spirit and scope of the invention.

Reference herein to "one embodiment", "an embodiment", "an implementation" "an example" or similar formulations herein, means that a particular feature, structure, operation, or characteristic described in connection with the embodiment, is included in at least one embodiment of the present invention. Thus, different appearances of such phrases or formulations herein do not necessarily refer to the same embodiment. Furthermore, various particular features, structures, operations, or characteristics may be combined in any suitable manner in one or more embodiments.

BRIEF DESCRIPTION OF THE DRAWINGS

The detailed description is described with reference to the accompanying figures. In the figures, the left-most digit(s) of a reference number identifies the figure in which the reference number first appears. The figures are not necessarily drawn to scale.

DETAILED DESCRIPTION

Figure 1:
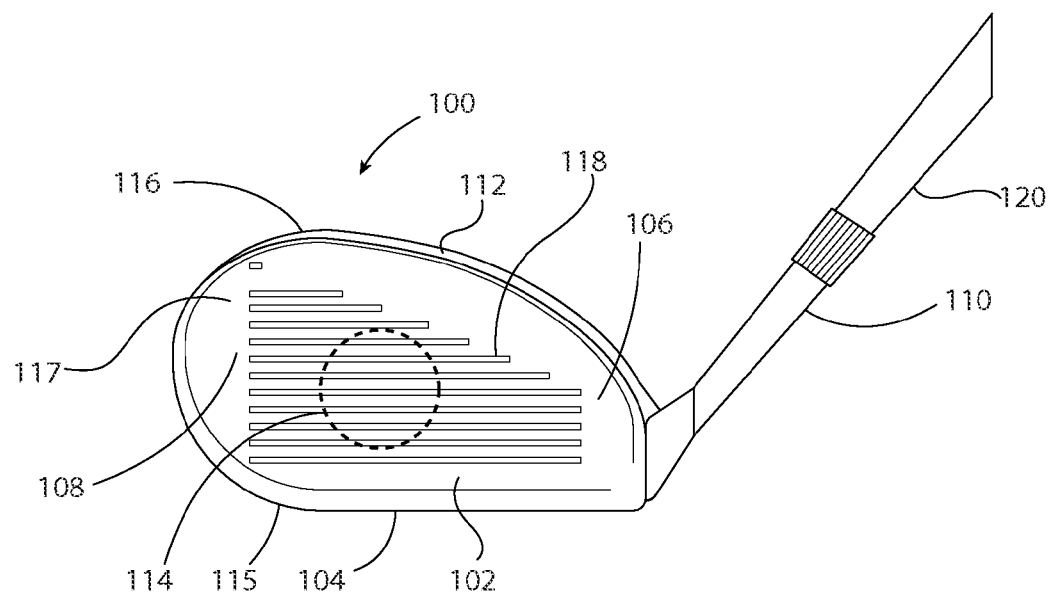
FIG. 1 is a perspective view of an example golf-club head which contains oxidized-ceramic zirconium.

Described in this paper are ceramic-metallic-alloy articles comprised of ceramic Zirconium alloy material.

In one aspect, an article consists of Zirconium of about 70% unalloyed Zirconium and about 30% Niobium.

In another aspect, an article consists of between about (95-98%) unalloyed Zirconium and about (2-5%) Niobium (Zr705).

The article may be heated in oxygen environment at temperatures ranging between about 200° C. to about 880° C., for a duration of between about 10 minutes to 110 minutes.

Exposing the article to thermal treatment in an oxygen-rich environment provides an oxidized-zirconium-alloy apparatus. One, two, or three heating cycles may be used, with a quenching cycle, such as a water or air, interposed between each heating step. The temperature and duration of heating are selected to provide a strongly adherent oxide-rich layer with increased scratch, wear and hardness resistance, and decreased friction resistance.

The surface of the alloy may be polished to increase wear and impact resistance while decreasing friction resistance.

Other machining, casting, or forging of the alloy into a desire shape may be achieved by any suitable methods used with titanium or zirconium alloys.

In use, an example methodology is used to produce articles that consisting of unalloyed Zirconium with Niobium within the composition range desirable to produce a hard, scratch-resistant surface.

The article may provide outer surfaces having ceramic properties for use with sporting goods equipment, dishware, appliances, helmets, guns, tips for bullets or armor-piercing shells, penetrator materials for an armor piercing sabot, bullet-proof vests, armor vehicles including tanks and other armor-protecting vehicles, boat hulls, ship hulls, automobile bodies, truck bodies, airplane fuselages, the leading edge of airplane wings, helicopter rotors, and rockets.

The inventors believe that airplanes, vehicles, boats hulls and other applications in which the surfaces must be hardened, and exhibit reduced friction and durability will benefit from the use of unalloyed oxidized Zirconium with Niobium.

The article may also be used as a casing in lieu of or in conjunction with plastics for computers, laptops, tablets, smart phones, cell phones, and the like.

The article may also be used to construct sports equipment. In one example, the material is a ceramic-metallic alloy such as unalloyed Zirconium with Niobium.

Heretofore, sports-equipment materials, such as golf-club heads have consisted of wood, laminates of various woods and woods filled with resins, metals of aluminum, stainless steel, brass, bronze, titanium, various alloys of these and other metals, graphite fiber, and reinforced plastics of various kinds.

Tennis rackets and golf-club shafts heretofore have consisted of monolithic-metal alloy such as carbon steel, stainless steels, high alloyed steels, titanium and aluminum alloys and plastic-matrix composites reinforced with graphite fiber, boron fiber and various metal wires such as titanium.

An ideal golf club material is lightweight, has high strength, hardness; wear resistance, impact strength or toughness and high modulus or resistance to bending. A shaft, and especially composite shafts, should have high-shear strength and torsional modulus, i.e., high resistance to torqueing or twisting.

In one example, a golf-club head (such as a driver, fairway wood, putter, irons, and the like) contains ceramic-metallic-alloy articles comprised of ceramic Zirconium alloy material in different forms, such as a coating, as one or more layers of a portion of the head, encapsulated, integral, or selectively distributed at various locations of a golf-club head.

Articles comprised of ceramic Zirconium alloy material may also be used singularly, or as a part of composite mixed with other materials such wood, metal, or plastic, and other suitable materials for use as part of the club head.

For instance, FIG. 1 is a perspective view of an example golf-club head 100 which contains ceramic Zirconium alloy materials such as Zirconium of about 70% unalloyed Zirconium and about 30% Niobium. In another aspect, the head 100 consists of between about (95-98%) unalloyed Zirconium and about (2-5%) Niobium (Zr705).

Club head 100 includes a face portion 102, a sole portion 104, a heel portion 106, a toe portion 108, a hosel portion 110, a top edge 112, a sweet-spot portion 114, a bottom edge 115, and a back portion 116. Face portion 102 forms a leading edge 117 of head 100. Conversely, back portion 116 is opposite leading edge 117, and forms the back-most portions of head 100; i.e. back portion 116 is the trailing edge.

Face portion 102 is a surface for striking a ball, and may include groves 118 or other patterns. Sole portion 104 forms a bottom of head 100. Heel portion 106 forms a rear-striking portion of head 100. Hosel portion 110 forms an interface for inserting a shaft 120 into head 100, and securing shaft 120 therein by any suitable fastening means, including adhesive and/or other fasteners.

Face portion 102 may be formed of the aforementioned ceramic Zirconium alloy materials. That is, a selectable area of an outer-most surface of face portion 102 may include ceramic Zirconium alloy materials consisting of a ceramic compound such as Zirconia, and a metal-inner core (i.e., a backing layer) such as Zirconium, and Zirconium with niobium and oxygen (ZR-2.5Nb) and may also include titanium alloys in addition to the Nb.

For instance, the unalloyed Zirconium and Niobium may form the outer surface of sweet-spot portion 114. In another example, the outer surface may extend beyond sweet-spot portion 114, such as along the entire leading edge 117 of head 102. In another example, the ceramic Zirconium-Niobium composition may extend between heel portion 106 and toe portion 108, such as approximately commensurate with an area of face portion 102 where grooves 118 are located.

In areas, where ceramic the Zirconium-Niobium composition does not form a portion of head 100, other suitable materials may be used, such as steel, titanium, titanium alloys, graphite, boron, steel alloys or mixtures of the foregoing. The Zirconium-Niobium composition may be integrally formed by forging or casting, or other suitable means. That is, the surface portions of head 100 may be integrally formed by forging or casting. For parts of head 100 that are Zirconium-Niobium composition, those areas may be joined together by any suitable means such as adhesive, welding, forging, casting, or other means.

Alternatively, at outer-surface areas head 100 may be formed of ceramic-zirconium oxide containing Niobium.

Figure 2:
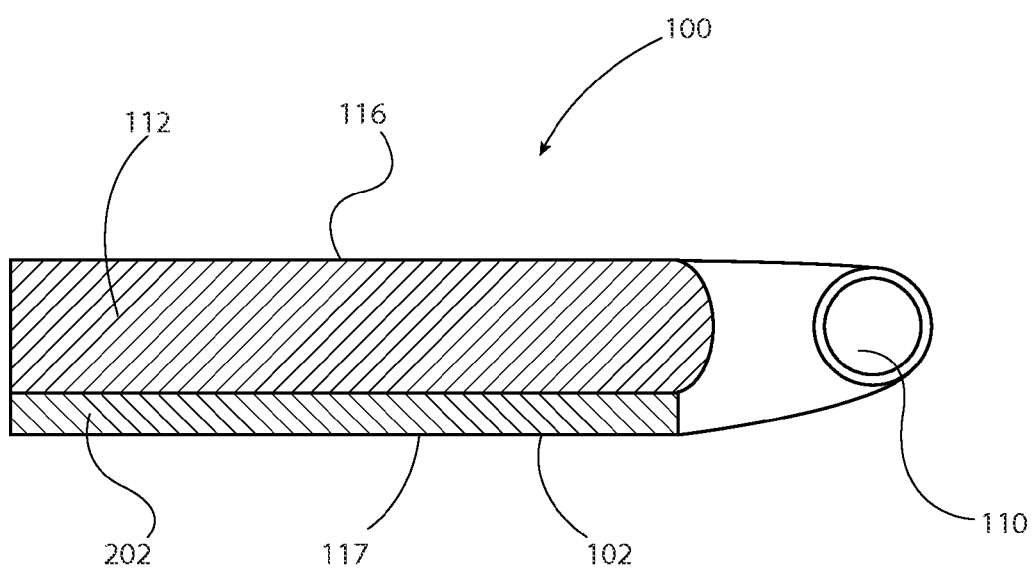
FIG. 2 is a top cross-sectional view of an example club head.

FIG. 2 is a top cross-sectional view of club head 100. As depicted in FIG. 2, leading edge 117 includes a surface layer 202 formed of ceramic-zirconia oxide. The thickness of surface layer 202 may vary. For example, in one implementation surface layer is about 5 μm-to-10 μm thick measured, in a perpendicular manner to leading edge 117 (i.e., measured from face to back).

In another example, surface layer 202 may have other thicknesses, greater or less than 5 μm-to-10 μm, such as between about 10 μm to about 1 cm. For instance, a thickness of surface layer 202 consisting of ceramic-zirconium oxide containing Niobium may range from about 0.1 mm to about 1.0 mm. In another example, the thickness of layer 202 consisting of ceramic-zirconium oxide containing Niobium is about 0.2 mm to about 0.8 mm. In yet another example, the thickness of layer 202 is about 0.4 mm to about 0.6 mm. And in still another example, the thickness of layer 202 is about 0.5 mm.

Figure 3:
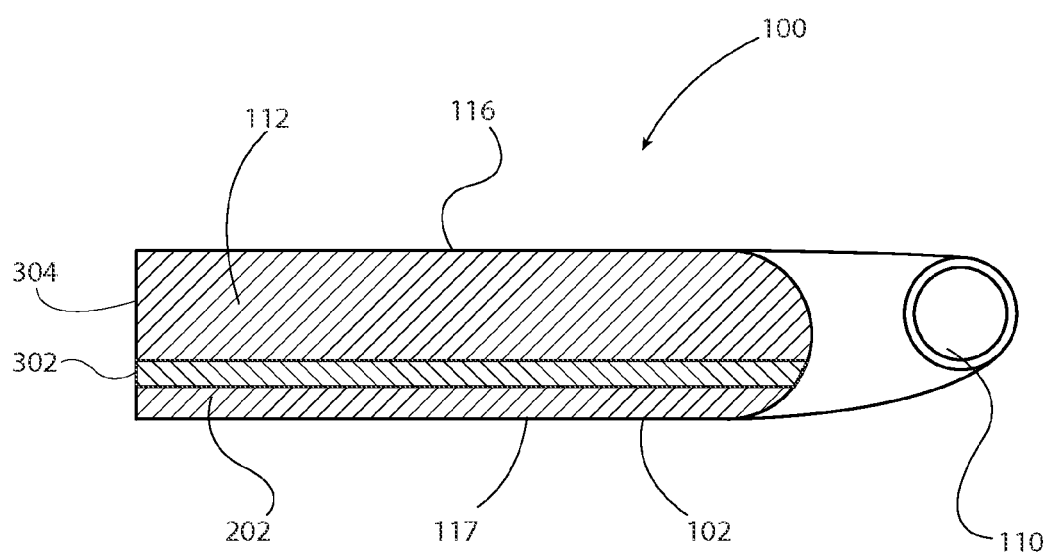
FIG. 3 is a top cross-section view of an example club head with a support layer.

Club head 100 may also include a support layer. For example, FIG. 3 illustrates a top cross-sectional view of club head 100. As depicted in FIG. 3, a support layer 302 is sandwiched between surface layer 202, and rear-portion 304 of club head 100. In the illustrated example, support layer 302 may include Zirconium or Zirconium with niobium and oxygen (ZR-2.5Nb). Support layer 302 may have any thickness or depth as well as height and length desired.

The density of support layer 302 may be less than or more than the density of surface layer 202.

Alternatively, support layer 302 may also constitute the remaining portion of club head 100. For example, support layer 302 may extend from a juncture of surface layer 202 to back portion 116 of club 100. That is, rear portion 304 and support layer 302 may comprise a single material with no demarcation line.

Surface layer 202, consisting of ceramic-zirconium oxide containing Niobium, in conjunction with support layer 302 or other materials in a multi-component head, may be integrally formed with these other materials by any suitable means, such as forging or casting. Alternatively, surface layer 202 and support layer 302 be joined together by adhesive bonding, welding, infrared brazing, combination of the foregoing, or other means. Other materials forming head 100 may be used with ceramic-zirconium oxide containing Niobium.

Figure 4:
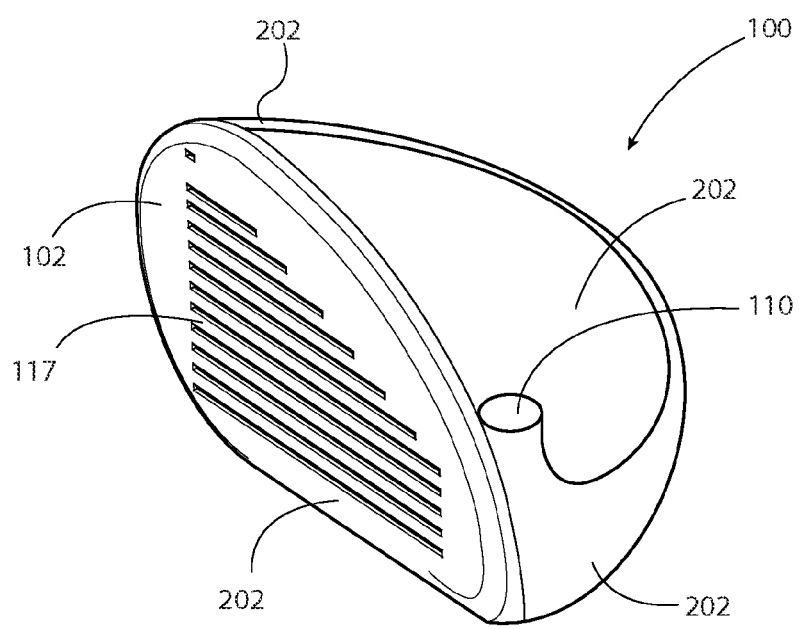
FIG. 4 is a perspective view of an example golf-club head which contains oxidized-ceramic zirconium.

FIG. 4 shows a perspective view of another example club head 100, such as a driver head. In this example, support layer 304 (not shown in FIG. 4) forms an inner core of club head 100, and is encapsulated in surface layer 202. The interior of club head 100 beyond support layer 304, such as its core (not shown) may be hollow or any suitable solid materials including support layer 304. That is the core may include a plethora of materials such as wood, metal, or plastic, and other suitable materials for use as part of club head 100. The volume of club head 100 depicted in FIG. 4 is generally between about 280 cc and 480 cc.

In addition, weighting of club 100 as depicted in FIGS. 1-4 and dimensions of each feature of club 100 may vary.

The shaft of the club or a tennis racket frame may also contain ceramic-zirconium oxide containing Niobium, and may be reinforced with other materials or intermixed as part of matrix. The shaft may also contain selectively concentrated portions or areas containing ceramic-zirconium oxide containing Niobium or other forms of zirconium oxide. The material of the shaft may also be encapsulated or layered.

Although some of the discussion above focuses on golf clubs and tennis rackets as the sample sports equipment, methodologies and principles described herein are not necessarily limited to golf clubs and tennis rackets, and may be applied to other sports equipment, including hockey sticks, baseball bats, lacrosse sticks, golf balls, pool sticks, and various other sports equipment.

In addition, the thickness, and weight of the ceramic-zirconium oxide alloy (such as the alloy containing Niobium above) of an outer surface material may vary depending on the application. Thickness of the layer of ceramic-zirconium oxide alloy (such as the alloy containing Niobium above) of an outer surface of an article may be varied by the amount of time these materials are exposed to heat and pressure. The process of creating the ceramic-zirconium oxide alloy may result in a ceramicized-metal article.

In other application, the outer surface (skin) of the wing of an airplane contains unalloyed oxidized Zirconium with Niobium having a thickness and configuration suitable for the aviation application. For instance, the skin of the airplane includes Zirconium alloy materials such as Zirconium of about 70% unalloyed Zirconium and about 30% Niobium. In another example, the skin consists of between about (95-98%) unalloyed Zirconium and about (2-5%) Niobium (Zr705).

The aforementioned Oxidized Zirconium alloy compositions may be rolled to form skin plates or extruded. The inventors believe that these composition will exhibit a combination of properties which render them suitable for use in the wing structure or fuselage of aircraft.

In another application, the outer surface of the hull of a boat or ship contains unalloyed oxidized Zirconium with Niobium having a thickness and configuration suitable for boating or shipping application.

The inventors believe that airplanes, vehicles, boats hulls and other applications in which the surfaces must be hardened, and exhibit reduced friction and durability will benefit from the use of unalloyed oxidized Zirconium with Niobium.

In another application, the inner most and/or outer most surface of a container for containing liquid or gas, used on trucks, trains, ships, airplanes, or other mobile or stationary containers that may contain an unalloyed oxidized Zirconium with Niobium having a thickness and configuration suitable for such an application.

In any of the aforementioned embodiments, one skilled in the art, after having the benefit of this disclosure, may appreciate that the entire article (or multiple layers of the article) may consist of an unalloyed oxidized Zirconium with Niobium, i.e., a ceramicized metal. Therefore, the article may have varying thicknesses and layers of ceramicized metal.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A golf club comprising: a head including a face portion having an outer surface comprised of a ceramic-oxidized zirconium alloy consisting of about between 70-98 weight percent unalloyed Zirconium and about 2-30 weight percent Niobium.

2. The golf club of claim 1, wherein the outer surface is about 5 μm-to-10 μm thick.

3. An article having, at least, an outer surface comprising: a ceramic-oxidized zirconium alloy consisting of about between 70-90 weight percent unalloyed Zirconium and about 10-30 weight percent Niobium, wherein the article is selected from the group consisting of a skin of an airplane, an outer surface of a boat hull, an outer surface of a motor vehicle, an outer surface of a propeller, and an outer surface of helicopter rotor.

4. An article having, at least, an outer surface comprising: a ceramic-oxidized zirconium alloy consisting of about between 70-98 weight percent unalloyed Zirconium and about 2-30 weight percent Niobium, wherein the article is selected from the group consisting of coatings for kitchen ware, and encasing members for computers, laptops, tablets, smart phones, and cell phones.

* * * * *